March 12, 1968 W. R. AIKEN 3,373,422
SIGNALLING DEVICE HAVING VANE ROTATED ABOUT AN
AXIS BY AN ELECTROSTATIC FIELD
Filed Sept. 21, 1965 7 Sheets-Sheet 1

INVENTOR.
WILLIAM ROSS AIKEN

March 12, 1968 W. R. AIKEN 3,373,422
SIGNALLING DEVICE HAVING VANE ROTATED ABOUT AN
AXIS BY AN ELECTROSTATIC FIELD
Filed Sept. 21, 1965 7 Sheets-Sheet 2

March 12, 1968

W. R. AIKEN 3,373,422

SIGNALLING DEVICE HAVING VANE ROTATED ABOUT AN
AXIS BY AN ELECTROSTATIC FIELD

Filed Sept. 21, 1965

March 12, 1968  W. R. AIKEN  3,373,422
SIGNALLING DEVICE HAVING VANE ROTATED ABOUT AN
AXIS BY AN ELECTROSTATIC FIELD
Filed Sept. 21, 1965  7 Sheets-Sheet 6

March 12, 1968  W. R. AIKEN  3,373,422
SIGNALLING DEVICE HAVING VANE ROTATED ABOUT AN
AXIS BY AN ELECTROSTATIC FIELD
Filed Sept. 21, 1965  7 Sheets-Sheet 7

United States Patent Office 3,373,422
Patented Mar. 12, 1968

3,373,422
SIGNALLING DEVICE HAVING VANE ROTATED ABOUT AN AXIS BY AN ELECTROSTATIC FIELD
William R. Aiken, Los Altos Hills, Calif., assignor to Electronix Ten, Inc., San Francisco, Calif., a corporation of California
Filed Sept. 21, 1965, Ser. No. 489,017
10 Claims. (Cl. 340—373)

ABSTRACT OF THE DISCLOSURE

In a signalling device of the type constituted by a vane mounted for swinging movement from a first position to an angularly displaced second position, wherein movement of the vane is effected by setting up electrostatic fields between the vane and adjacently located electrodes, the improvement of providing an electrode of arched or curved conformation adjacent the intended path of movement of an outer edge of the vane, and of arranging said arched electrode in such a manner that the electrostatic field established between said vane and said arched electrode increases in strength in the direction of the intended movement of the vane from said first toward said second position. This is accomplished by increasing the width of the electrode in the direction of the intended movement of the vane and/or by locating said electrode in such a manner that it converges toward the path of movement of the outer edge of said vane in the direction of the intended movement of said vane.

---

The present invention relates to adjustable signalling devices of the type employing relatively movable components to display or conceal an identifying mark or sign such as a number, a warning inscription, a colored area and the like. More particularly, the present invention relates to adjustable signalling devices of the type referred to, wherein the relative movement of the sign-displaying and concealing components is accomplished by the repelling and/or attracting effect of electrostatic charges. Usually in devices of this type a sheet or "vane" is hingedly supported for movement from an initial position to positions that are angularly displaced from said initial position, and such movement is effected by setting up a vane-repelling electrostatic field between the vane and an electrode and/or by setting up vane-attracting electrostatic fields between the vane and other electrodes that may be provided adjacent and above the intended path of movement of the vane.

The difficulty with electrostatically actuated signalling devices of the type described, is to effect movement of the vane to a position wherein it is disposed fully at right angles to its initial position or to positions beyond said right angle position without requiring high electrostatic charges. This presents a serious problem because in certain signalling devices it is desirable, and may even be necessary, to move the vane to positions beyond a right angle position relative to its initial position. The problem is often complicated by the fact that certain signalling devices require vanes of substantially greater width than height so that laterally placed auxiliary electrodes have only a very limited effect upon the operation of the vane, and sometimes the nature and construction of a composite signalling device, i.e. a device comprising a plurality of closely grouped movable vanes, is such that there is no space for laterally placed electrodes, or the presence of such electrodes would interfere with the operation of the individual units of the device and/or partially obstruct the intended display.

It is an object of my invention to provide a signalling device of the type referred to, wherein the vane may readily be raised to positions at right angles relative to its initial position and to positions outwardly beyond said right angle position, without the use of high potentials.

It is another object of the invention to provide a signalling device of the type referred to, wherein even a wide vane may be readily raised to the above defined positions, without the use of any laterally placed vane-attracting electrodes.

Still another object of the invention is to provide an arrangement by means of which the vane may be readily moved in both directions between extreme operational positions thereof that are angularly displaced from each other by more than 90°.

These and other objects of my invention will be apparent from the following description of the accompanying drawings which illustrate certain preferred embodiments thereof and wherein FIGURE 1 is a schematic side elevation of an embodiment of the invention;

In accordance with my invention I achieve controlled movement of the vane to any angularly displaced position including positions that are displaced from its initial position by angles of 90° and more than 90°, by providing adjacent the path of the intended movement of an outer edge of the vane an arched vane-attracting electrode that is constructed and/or disposed in such a manner that vane-attracting electrostatic fields set up between said electrode and the vane increase in strength in the direction of the intended movement of the vane from its initial position to its intended maximum amplitude position. This may be accomplished by constructing the arched vane in such a manner that it increases in width in the direction of the intended movement of the vane and/or by disposing the arched electrode in such a manner relative to the intended path of movement of an outer edge of the vane that it converges toward said path in the direction of the intended movement of the vane and comes closest to said path in the plane defined by the vane in its intended maximum amplitude position.

The above described principles of my invention may not only be employed to swing the vane dependably from an initial position to a predetermined angularly displaced position, they may also be employed to return the vane dependably from its predetermined angularly displaced position to its initial position.

Figure 1:
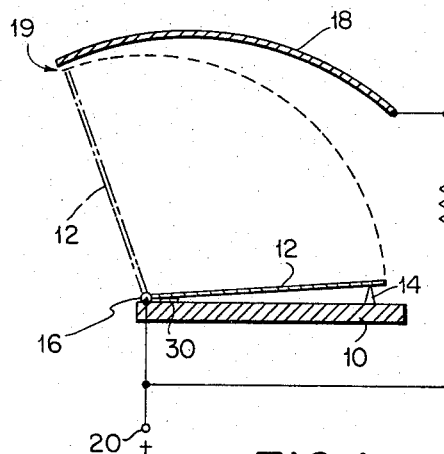

The embodiment of the invention illustrated in FIGURE 1 comprises a base in the form of horizontally disposed plate 10 of a material of some conductivity. Hingedly supported near the front edge thereof is a vane 12 which may be of conductive sheet material, such as metal foil but may also be made from sheet materials of higher resistivity. In its initial position adjacent the base 10, the vane is kept separated from the base by a suitable spacer element, such as the conical bead shown at 14, and the height of said spacer bead is preferably such that the vane is slightly raised and diverges from the base in a direction away from the hinge connection 16. Arranged above the vane is an arched top electrode 18 which may be made of metal foil or may be constituted by a coat of paint upon an arched ceiling. Said electrode defines a shallower arc than the intended arc of movement of the free end edge of the vane and may be arranged in such a manner relative to the path of movement of the said end edge that it comes closest to said path at a point of said path that is angularly spaced from the initial position of the vane by significantly more than an angle of 90°, as indicated by the arrow 19. To operate the described device, the base and the vane may be in conductive contact with each other and may both be permanently connected to a source of positive potential indicated at 20, and an initially open switch 22 may be provided to apply, upon closure, a negative potential to the arched electrode 18. When the switch 22 is closed, the electrostatic field set up between the arched electrode 18 and the vane 12 lifts the vane out of its reclined position and the vane rises to a position wherein the strength of the electrostatic field set up between its end edge and said arched electrode is at a maximum, which is where the gap between the free end edge of the vane and the arched electrode is at a minimum. The vane, therefore, swings rapidly into, and remains in the position indicated in phantom lines and identified by the arrow 19.

Figure 2:
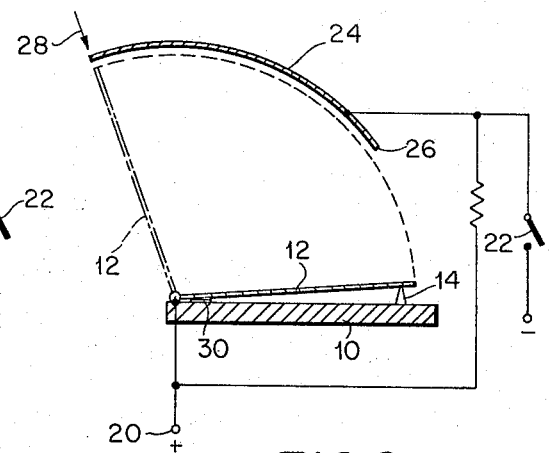
FIGURE 2 is a schematic side elevation of another embodiment of the invention.
Figure 3:
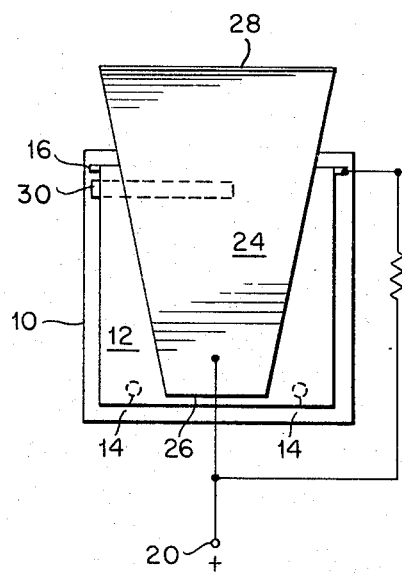
FIGURE 3 is a plan view of the embodiment of the invention shown in FIGURE 2.

The embodiment of the invention illustrated in FIGURE 2 differs from the embodiment of the invention illustrated in FIGURE 1 in that the arched top electrode 24 extends substantially parallel to the path of movement of the end edge of the vane 12. The width of said electrode, however, increases progressively in a direction from its bottom edge 26 to its top edge 28 and is widest at said top edge, as best seen in FIGURE 3. When a vane-attracting field is set up between the arched electrode 24 and the vane by closure of switch 22, the vane 12 seeks again a position wherein the strength of the field between its free end edge and the electrode 24 is set at a maximum. The location of maximum field strength is where the electrode reaches its greatest width. The vane, therefore, swings dependably into a position wherein its end edge is located below the upper end edge 28 of the arched electrode.

Both the above discussed embodiments of the invention require suitable means for restoring the vane to its initial position upon withdrawal of the vane-attracting potential to their vane-attracting electrodes 18 and 24, respectively. For this purpose the opposite ends of a strip of paper 30 may be glued to the base and the vane, respectively, in the region of the hinged connection 16 between the two, and after the vane has been raised, the resultant distortion of said strip of paper sets up a torsional strain that is effective to return the vane promptly to its initial position whenever the vane-attracting charge is removed from electrode 18 or 24, as the case may be.

Figure 4:
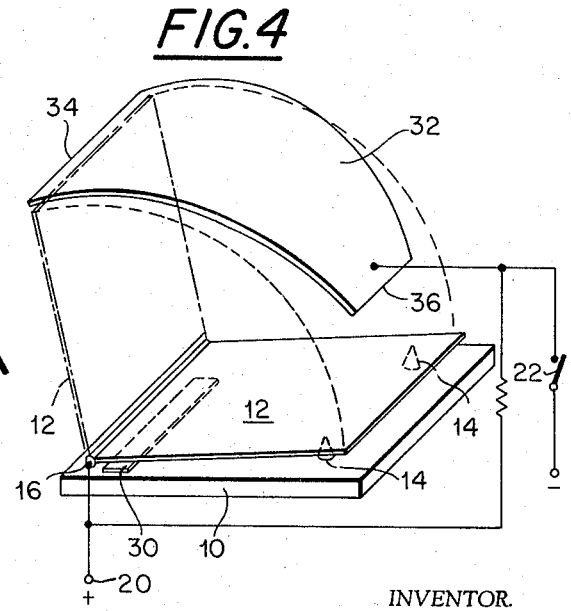
FIGURE 4 is a schematic perspective of yet another embodiment of the invention.

The embodiment of the invention illustrated in FIGURE 4 is particularly effective in that its vane-attracting top electrode combines the features of both the above described embodiments of the invention. In FIGURE 4 the arched vane-attracting electrode 32 is arranged adjacent the path of movement of the end edge of the vane 12 in such a manner that it approaches said path, with its top edge 34 being located much closer to said path than its bottom edge 36. At the same time, the width of the electrode 32 is arranged to increase from its bottom edge toward its top edge so that the latter is substantially wider than the former. As a result of these two factors, the vane 12 responds quickly to rise to a position wherein its end edge is located directly below the wide top edge 34 of the electrode whenever a vane-attracting electrostatic field is set up between the vane 12 and the electrode 32 by closure of switch 22.

Figure 5:
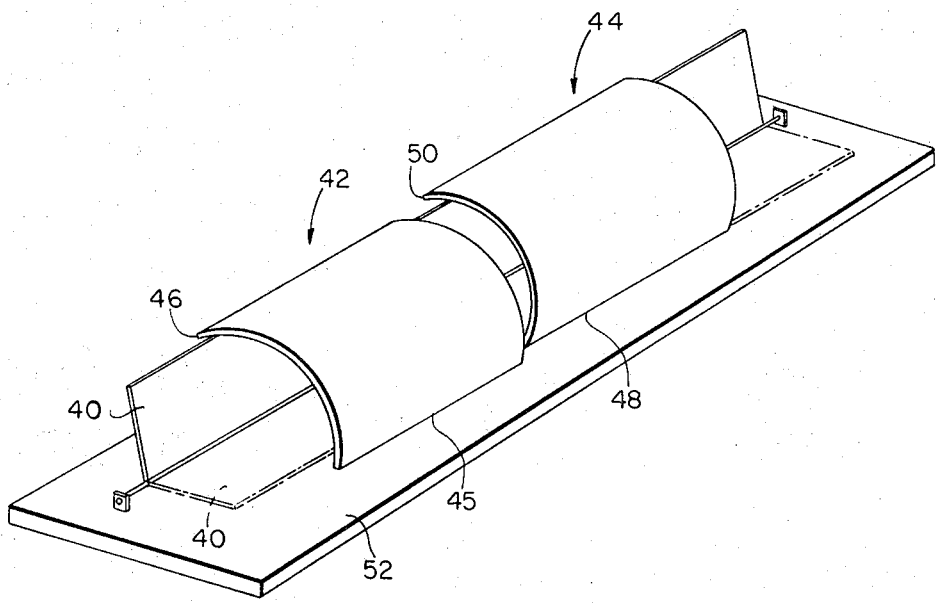
FIGURE 5 is a schematic perspective of a fourth embodiment of the invention.
Figure 6:
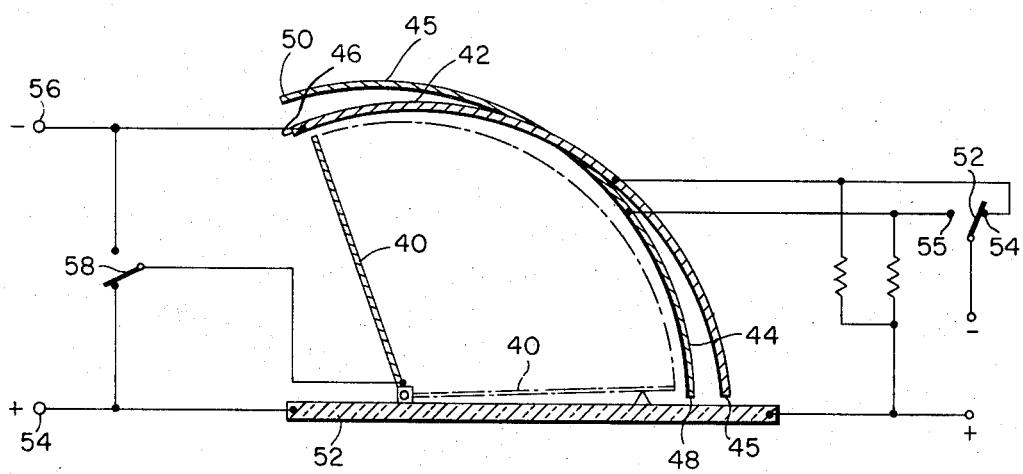
FIGURE 6 is a side elevation of the embodiment of the invention illustrated in FIGURE 5.

The embodiment of the invention illustrated in FIGURES 5 and 6 provides for positive movement of a vane 40 to a desired position angularly displaced from its initial position and for positive return of the actuated vane to said initial position of rest. It is especially applicable to vanes of substantially greater width than height, such as shown in FIGURE 5. The device possesses two juxtapositioned arched vane-attracting electrodes 42 and 44 respectively. Electrode 42 is a vane-raising electrode and is arranged to converge toward the path of travel of the free end edge of the vane 40 in the direction from its bottom edge 45 to its top edge 46. This is effective, upon establishment of a vane-attracting electrostatic field between the electrode and the vane, to raise the vane to a position of closest approach to the electrode, which position is shown in full lines in FIGURES 5 and 6. The second electrode 44 is arranged to approach the path of travel of the free end edge of the vane 40 in the opposite direction, its bottom edge 48 being located significantly closer to said path than its top edge 50. When a vane-attracting electrostatic field is established between the electrode 42 and the vane 40 by setting a switch 52 to contact 54, the vane is raised to the position illustrated in full lines; and by setting the switch 52 to contact 55, a vane-attracting electrostatic field is established between the vane and the electrode 45, and the vane is quickly and dependably returned to its initial position even though it may have been in a position that is angularly displaced from said initial position by more than 90°, and would ordinarily drop in the opposite direction upon disappearance of the electrostatic field that raised it originally into its elevated position.

Figure 7:
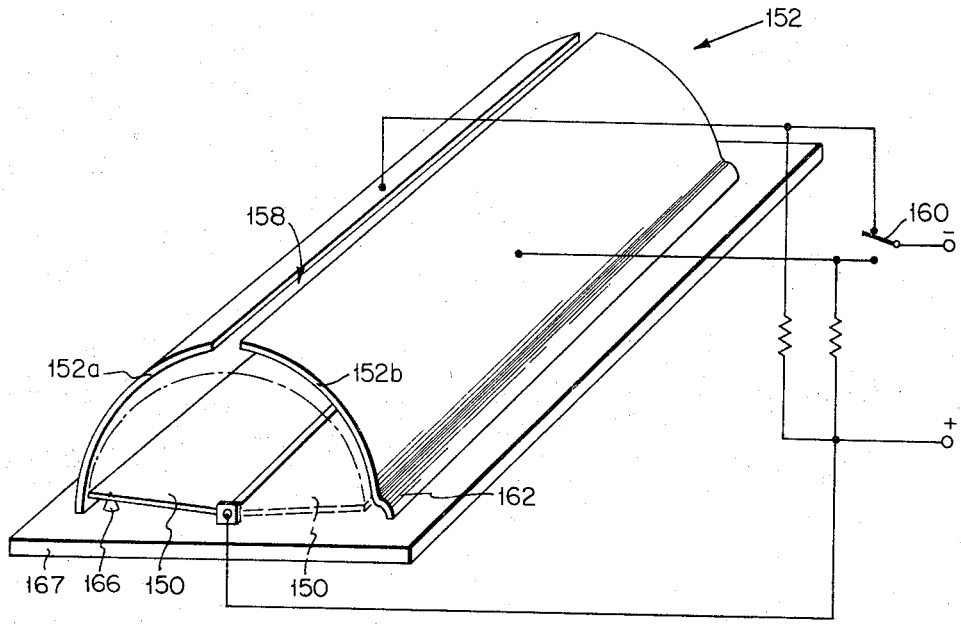
FIGURE 7 is a schematic perspective of yet another embodiment of the invention.
Figure 8:
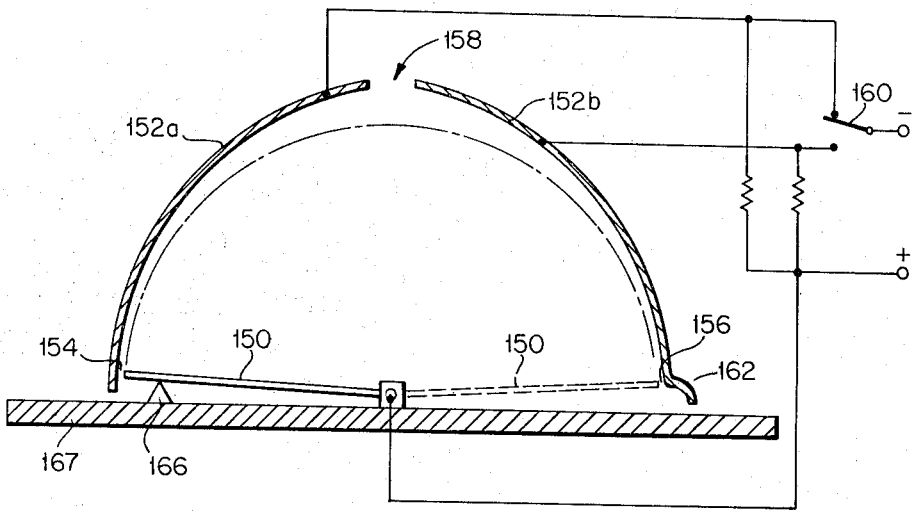
FIGURE 8 is a cross section through the embodiment of the invention shown in FIGURE 7.

The embodiment of the invention illustrated in FIGURES 7 and 8 is similar to the embodiment of the invention illustrated in FIGURES 5 and 6, but is somewhat easier to manufacture and provides for positive, electrostatically driven swinging movement of the vane 150 in both directions between extreme positions that may be angularly displaced from each other by as much as 180°. Placed over the prospective path of the free end edge of the vane is an arched conductive sheet 152 which approaches the intended path of movement of the outer edge of the vane as its opposite ends, as shown at 154 and 156, and which is split into two separate electrodes 152a and 152b by a central cleft or slot 158 that extends in a direction parallel to the axis of rotation of the vane from side edge to side edge of the arched sheet 152. When appropriate manipulation of a switch 160 applies a negative potential to the left part 152a of the arch 152, the vane-attracting field set up between said left part and the vane swings the vane from is initial position, shown in broken lines in FIGURES 7 and 8 to the position shown in full lines wherein the gap between the edge of the vane and said left part of the arch is smallest. On the other hand, when the switch 160 is manipulated to apply a negative potential to the right part of the arch 152b, the vane swings dependably back into its initial position. By deforming the right pier portion of the arch as shown at 162 so that it flares a limited distance away from the path of movement of the end edge of the vane, the extreme rightwardly folded position of the vane may be predetermined as being slightly raised from the base 164 so that spacer beads such as provided at 166 on the opposite side of the base 167 are unnecessary. The reason for this phenomenon is again that when there is a vane-attracting electrostatic field established between the arched electrode 152b and the vane 150, the vane seeks a position wherein the gap between its outer edge and the arched electrode is at a minimum which it is when the vane points to the area directly above the outwardly flared right pier portion 162 of the arch.

Figure 9:
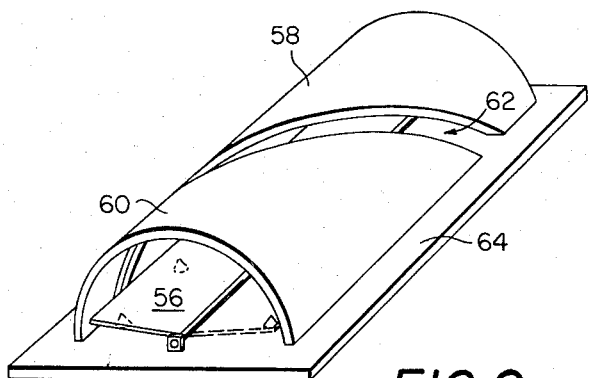
FIGURE 9 is a schematic perspective of still another embodiment of the invention.
Figure 10:
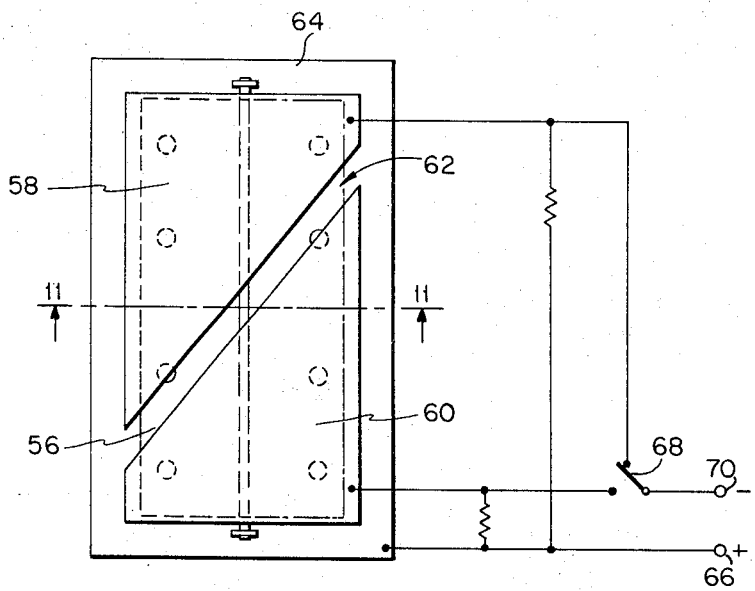
FIGURE 10 is a schematic plane view of the embodiment of the invention illustrated in FIGURE 9.
Figure 11:
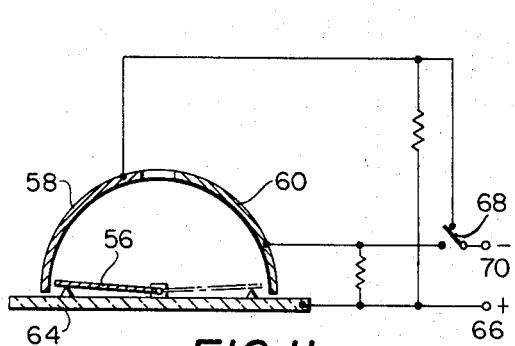
FIGURE 11 is a cross section through the embodiment of the invention illustrated in FIGURES 9 and 10, taken along line 11—11 of FIGURE 10 and viewed in the direction of the arrows associated with said line.

In the embodiment of the invention illustrated in FIGURES 9, 10 and 11 the vane 56 can be actuated in opposite directions by a pair of juxtaposed arched electrodes 58 and 60 that may actually be formed by a single rectangular piece of arched metal foil which is divided into two portions by a diagonal slot 62. Due to the diagonal disposition of the dividing slot 62, the electrode 58 increases in width in counterclockwise direction as viewed in FIGURES 9 and 11, and the electrode 60 increases in width in the opposite direction. In the exemplary control circuitry illustrated in FIGURES 9, 10 and 11, the base 64 of the device is permanently connected to a source of positive voltage indicated at 66, and a switch 68 may be manipulated to apply selectively a negative voltage to either the electrode 58 or the electrode 60. When the source of negative potential 70 is connected to the electrode 58, the vane 56 swings into a position that is displayed by an angle of almost 180° from its initial position, as illustrated in full lines in FIGURES 9, 10 and 11; and when the source of negative potential 70 is connected to the electrode 60, the vane is swung back into its initial position adjacent the base 64 on the opposite side of its axis of rotation, as illustrated in phantom lines in 9, 10 and 11.

Figure 12:
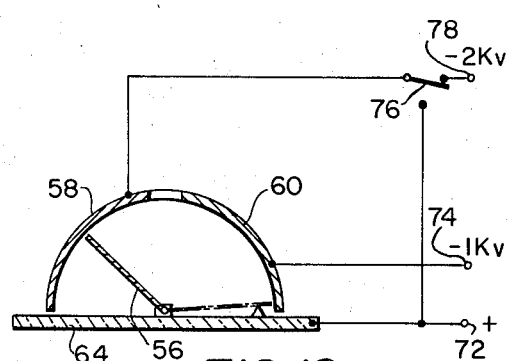
FIGURE 12 is the same cross section as FIGURE 11, showing a modified control circuitry for the device and illustrating the different operational effect obtained with the modified control circuitry.

FIGURE 12 illustrates a different control circuit that is applicable not only to the embodiment of the invention illustrated in FIGURES 9, 10 and 11, but is also applicable to the embodiments of the invention illustrated in FIGURES 5, 6, 7 and 8. In said FIGURE 12, the base 64 is permanently connected to a source of positive potential 72, and the vane-returning electrode 60 is permanently connected to a source of negative potential 74. The vane-raising electrode 58, however, may selectively be connected by a switch 76 to said source of positive potential 72 or a source 78 of a significantly higher negative potential than the source of negative potential 74. When the switch 76 is set to connect the vane-raising electrode 58 to the source of positive potential 72, the vane-attracting electrostatic field set up between the vane and electrode 60 holds the vane in the position indicated in phantom lines in FIGURE 12 wherein it extends closely adjacent to the base 64 of the device. When the switch 76 is set to connect the vane-raising electrode 58 to the source of negative potential 78, however, the vane-attracting electrostatic field set up between said electrode 58 and the vane predominates over the vane attracting electrostatic field still existing between the electrode 60 and said vane, and swings the vane into the rearwardly reclined position illustrated in full lines. It is unable to move the vane to a degree where it is displaced from its initial position by a greater angle owing to the retracting effect of said vane-returning electrode 60 which is still in energized condition. The control circuitry illustrated in FIGURE 12 offers the advantage that the degree of actuation of the vane, and hence its "raised" position, may be precisely predetermined by proper choice of the negative potentials applied to the two vane-actuating electrodes 58 and 60.

Figure 13:
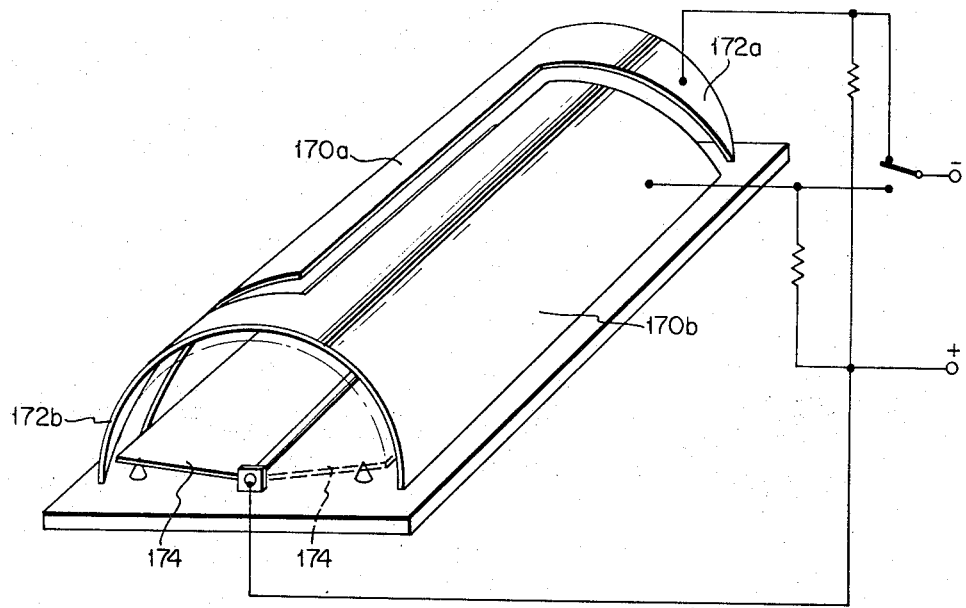
FIGURE 13 is a schematic perspective of an embodiment of the invention that is similar to the embodiment illustrated in FIGURES 9, 10, 11 and 12.
Figure 14:
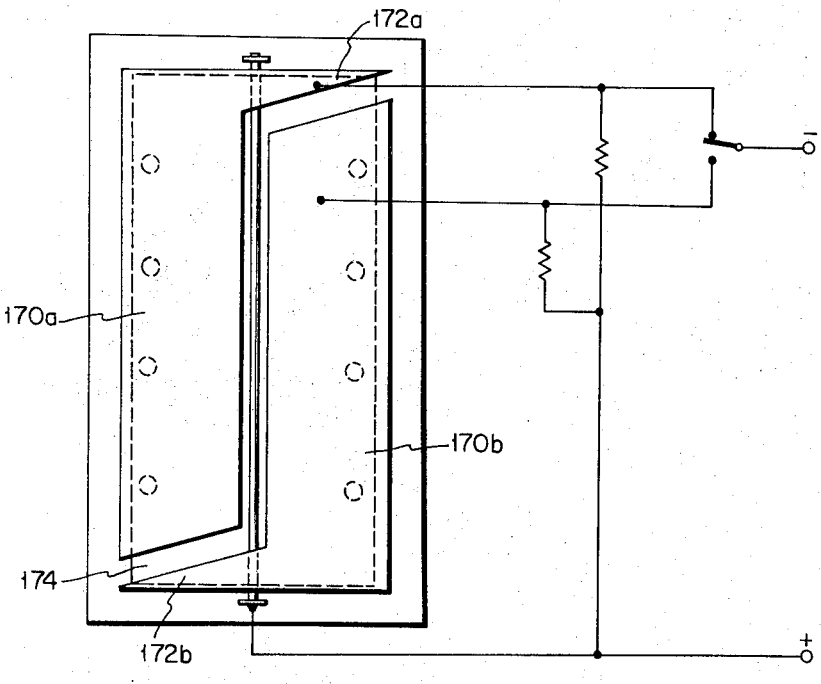
FIGURE 14 is a plan view of the embodiment of the invention shown in FIGURE 13.

The embodiment of the invention illustrated in FIGURES 13 and 14 is similar to, and operates in much the same manner as the embodiments of the invention illustrated in FIGURES 9, 10, 11 and 12, but its vane-actuating electrodes are of a somewhat more sophisticated design. These vane-actuating electrodes are formed by two arch sections 170a and 170b arranged in tandem relationship, and each arched section has a laterally located tapering tail section 172a and 172b, respectively, that extends adjacent the main portion of the opposite electrode into alignment with the opposite end edge said opposite electrode. These tail portions 172a and 172b ensure that when a vane-attracting potential is applied to an electrode 170a or 170b, as the case may be, the vane 174 is dependably swung into a position below the widest portion of the attracting electrode even though it may have been located in its opposite extreme position below the widest portion of the opposite electrode.

Figure 15:
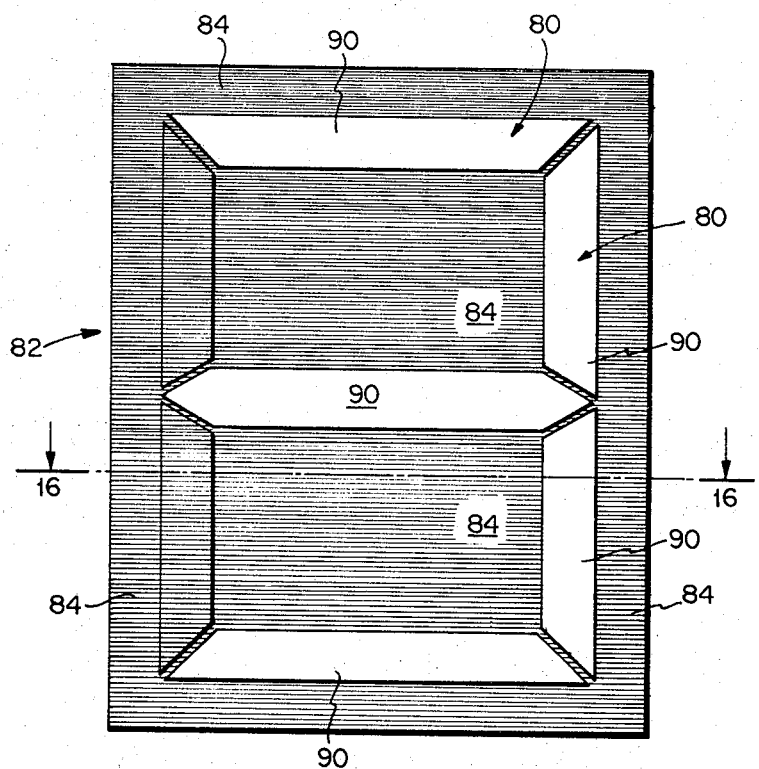
FIGURE 15 is a front elevation of a changeable message sign to which the principles of my invention have been applied.

FIGURE 15 illustrates a changeable message sign of a simplified construction which uses only seven changeable bar-shaped components 80 to form any one of the numbers from 0 to 9. Six of the components are arranged to define a rectangular frame, with each, the top and the bottom of the frame, being formed by a single component and with each of its sides being formed by two vertically aligned components. A seventh component is located in the center of the frame in a position parallel to the top and bottom components. By illuminating selected ones of the components or by providing one of the surfaces of each component with a contrasting coat of paint and causing selected one of said components to present one or the other of their surfaces to the outside, any one of the numbers 0 to 9 may readily be set up. In FIGURE 15, one surface of each component 80 is provided with a bright coat of paint, and by adjusting the three horizontal components and the right side components so that they present their bright surfaces to the outside, the message sign is made to present the figure "3" to the onlooker. By employing the principles of my invention as described above for selectively changing the position of the figure-forming components 80, it is possible to construct a very compact and inexpensive message sign of the type described.

Figure 16:
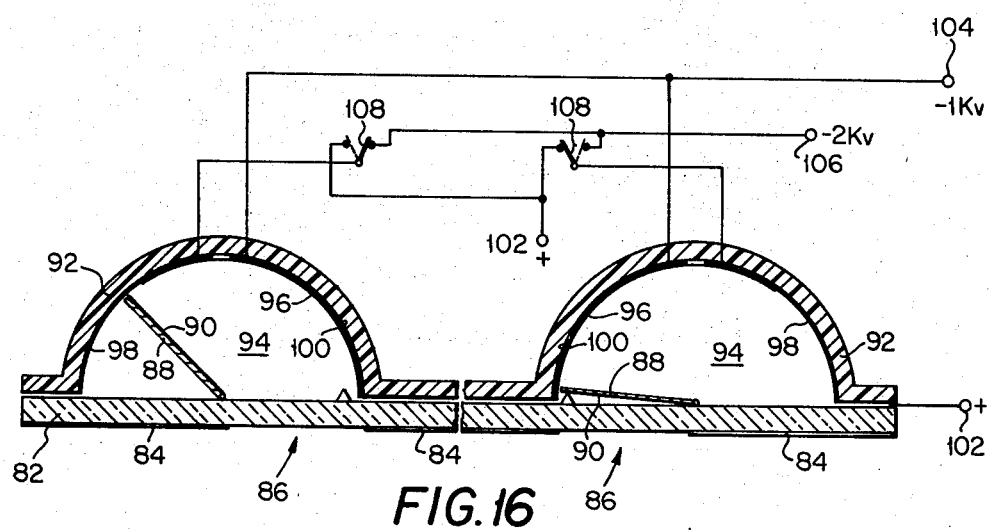
FIGURE 16 is a section through the message sign illustrated in FIGURE 15 taken along line 16—16 thereof and viewed in the direction of the arrows associated with said line.

Having reference to FIGURE 16, the front wall of the sign is formed by a pane of glass 82 that has been painted black as indicated at 84, except for areas 86 corresponding in contour to the above described seven components 80. Hingedly supported from the inner surface of said pane 82 adjacent one of the longitudinal edges of each of said areas 86 is a vane 88 which is of the same size and shape as the area 86 with which it cooperates, and which has its other surface painted white as indicated at 90. Placed over and suitably secured to the rear surface of the plane 84 is a molded casing or cover of plastic material 92. Said casing forms arched recesses or cavities 94 of a radius that is somewhat larger than the radial depth of the vanes 88. Said recesses 94 are placed in such a manner that each of the window areas 86 of the front plane 82 is covered by such a recess in such a manner that the center axis of the recess coincides approximately with the axis of rotation of the vane, and one quadrant of the recess is located directly behind the window area 86 while the other quadrant is located behind the adjacent paint-covered area of the pane 82. The arched inner surface of each recess 94 is painted in black to the extent to which it may be visible through its window, as indicated at 96. Arranged upon said arched inner surface are vane-actuating electrodes 98 and 100 of the conformation and location illustrated in, and described in connection with, FIGURES 9, 10, 11 and 12.

These electrodes 98 and 100 may be painted upon the arched inner surfaces of the recesses 94 with a black conductive paint or may be formed by black or transparent metal screens.

For selectively controlling the position of the individual vanes 88, the front pane 82 and the vane may be permanently connected to a source of positive potential indicated at 102, and the electrodes 100 that reach their greatest width behind the window areas 86 of the pane are permanently connected to a source of negative potential indicated at 104. The electrodes 98 that reach their greatest width behind obscured areas of the front pane may selectively be connected by manipulation of a switch 108 to the source of positive potential 102 or to a source of a significantly larger negative potential indicated at 106. When a switch 108 is set to connect an electrode 98 to the source of positive potential 102 as illustrated on the right side of FIGURE 16, its vane 88 is swung into a position closely adjacent its window area 86, as likewise illustrated at the right side of FIGURE 16, and presents its white surface 90 to the outside, as shown in FIGURE 15. When an electrode 98 is connected to the source of high negative potential 106, however, the vane 88 swings into the rearwardly inclined position illustrated at the left side of FIGURE 16, wherein it is completely concealed from view through the window area 86. To an onlooker said window area, therefore, appears to be as black as the painted front surface 84 of the pane 82, as shown in FIGURE 15. By closing selected ones of the switches 108 the proper vanes 88 may be withdrawn from view through the unpainted areas 86 of the glass pane so that only the black ceiling in the recesses 94 behind the pane will be visible from the outside. In this manner any one of the numbers 0 to 9 may be set up on the glass pane 82. In modified embodiments of the invention of the type illustrated in FIGURES 15 and 16, the front window 82 may be removed some distance from the vanes and may not form a part of the electrical control system of the device.

The described changeable message sign is of the simplest construction and is easy to manufacture. It has an exceedingly simple control circuit and it is easy to operate.

Figure 17:
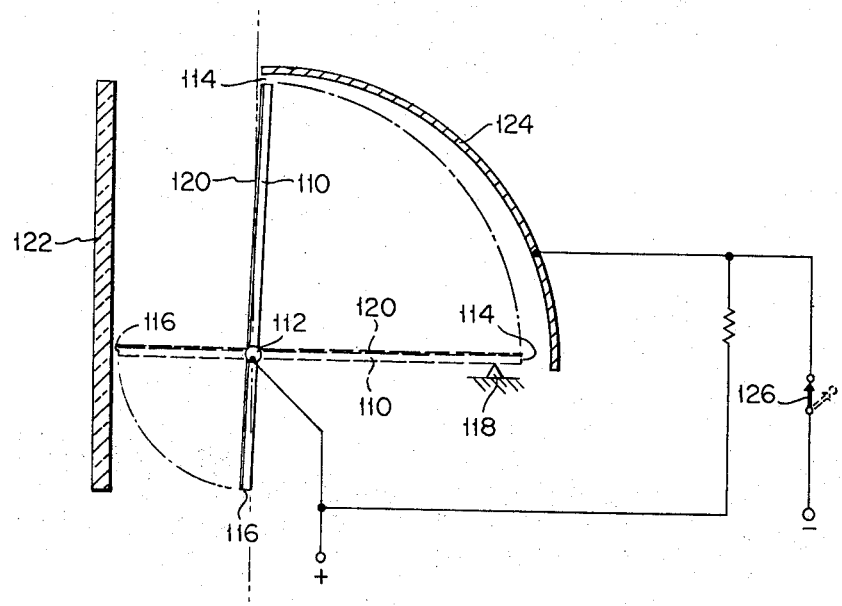
FIGURE 17 is a schematic side elevation of still another embodiment of the invention.

The embodiment of the invention illustrated in FIGURE 17 does not require separate means for returning the vane 110 to its position of rest. To this end the vane is hinged for rotation about an axis 112 that is located intermediately of its top and bottom edges 114 and 116, respectively, but somewhat displaced from its geometrical center axis in the direction of its bottom edge 116. Suitable stop means 118 is provided to hold the vane 110 in a horizontal position wherein a mark on its outer surface, such as the coat of conspicuous paint indicated at 120, is not visible through the window 122. To swing the vane into a vertical position and thus expose its painted surface 120 to view through the window 122, an arched electrode 124 is arranged adjacent the path of movement of its edge 114 along the upper quadrant of said path on the side opposite to the window pane 122, and means is provided in the form of a switch 126 to apply a vane-attracting potential to said electrode 124. As illustrated in FIGURE 17 the arched electrode 124 is of such length that it ends a small distance before the vertical plane containing the axis of rotation 112 of the vane. The vane, therefore, will never reach a fully vertical position. Hence, whenever the switch 126 is reopened and the vane-attracting potential is withdrawn from the electrode 110, the vane drops under the force of gravity into the horizontal position determined by the stop 118 due to the location of its hinge axis 112 at a point displaced from the geometrical axis of the vane. It will be understood that the arched electrode 124 may be shaped and disposed as illustrated in any one of FIGURES 1, 2, 3 and 4.

Figure 18:
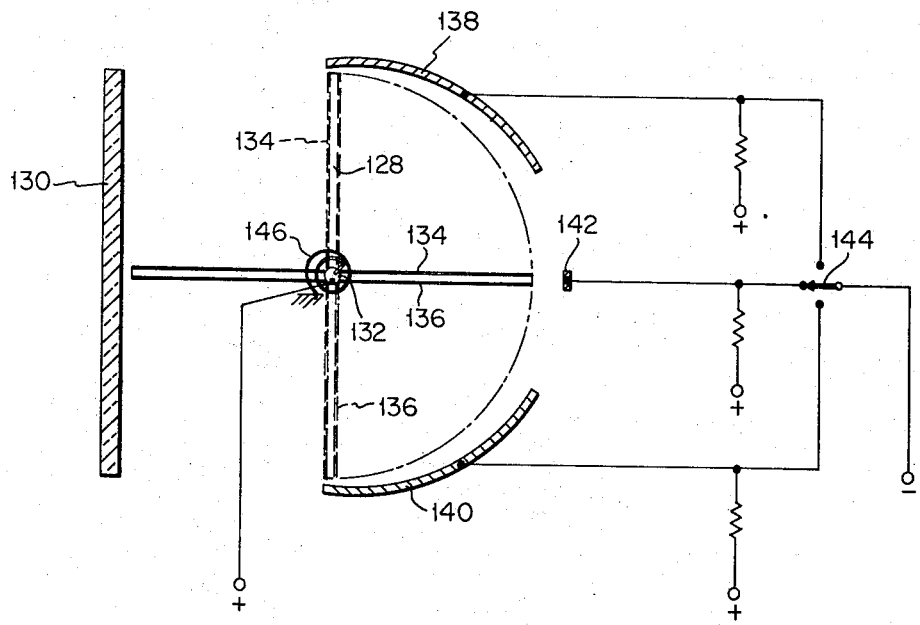
FIGURE 18 is a schematic side elevation of yet another embodiment of the invention that is similar to the embodiment illustrated in FIGURE 17.

The embodiment of the invention illustrated in FIGURE 18 provides an arrangement for selectively exposing both sides of a vane 128 to view through a window 130. The vane is mounted for rotation about a horizontally disposed axis 132 that is coincident with a center axis of the vane; and both sides of the vane may carry different markings such as the coats of different paint indicated at 134 and 136, respectively. Arranged adjacent the orbit of the outer edges of the vane along both the upper and the lower quadrants of said orbit on the side opposite to the window pane 130, are arched electrodes 138 and 140, respectively, which may be of the construction and disposition relative to the path of the outer vane edges described hereinbefore in connection with any one of FIGURES 1, 2, 3 and 4. In addition to the arched electrodes 138 and 140, the embodiment of the invention illustrated in FIGURE 18 has a bar-shaped electrode 142 that is located adjacent the orbit of the outer edges of the vane intermediately of the arched electrodes 138 and 140 in the same horizontal plane as the axis of rotation 132 of the vane. A switch 144 may be manipulated to apply selectively vane-attracting potentials to either of the arched electrodes 138, 140 or to the bar-shaped electrode 142. When the switch 144 is set to apply a vane-attracting potential to the bar-shaped electrode 142, the vane 104 assumes, and remains in the horizontal position shown in full lines in FIGURE 18 without the aid of any mechanical stop or support means. In this position neither of its marked surfaces 134 or 136 are visible through the window 130. When the switch 144 is set to apply a vane-attracting potential to the upper one of the arched electrodes, the vane swings quickly in counterclockwise direction into a vertical position and presents the marking 134 to view through the window 130. On the other hand, when the switch 144 is set to apply a vane-attracting potential to the lower one of the arched electrodes, the vane swings rapidly in clockwise direction into a vertical position wherein it exposes the marking 136 on its opposite surface to view through the window 106. Hence, in the embodiment of the invention illustrated in FIGURE 18, it is possible to expose both the surfaces of the vane 128 to view and one and the same vane may be employed to give two different signals. To insure prompt return of the vane from its vertical positions to its horizontal position of rest, the device may be provided with a suitable centering spring as indicated at 146.

While I have explained by invention with the aid of certain preferred embodiments thereof, it will be understood that the invention is not limited to the specific constructional details nor the specific control circuitries shown and described by way of example, which may be departed from, without departing from the scope and spirit of my invention. Specifically the invention is not limited to the use of direct current for controlling the position of the vane.

I claim:

1. A signalling device comprising a vane, means for supporting said vane for movement about an axis between first and second angularly displaced positions, and means for moving said vane from said first to said second position including an arched electrode located adjacent the intended path of movement of an outer edge of said vane, and means for setting up a vane-attracting electrostatic field between said vane and said electrode.

2. A signalling device comprising a vane, means for supporting said vane for movement about an axis, between first and second angularly displaced positions, and means for moving said vane from said first to said second position including an arched electrode located adjacent the intended path of movement of an outer edge of said vane, and means for setting up a vane-attracting electrostatic field between said vane and said electrode, said electrode being arranged to establish an electrostatic field of increasing strength in the direction of movement of the vane from said first to said second position.

3. A device according to claim 2 wherein said electrode is constructed to increase in width in the direction of movement of the vane from said first to said second position.

4. A device according to claim 2 wherein said electrode is arranged to converge toward the intended path of movement of the outer edge of the vane in the direction of said vane from said first to said second position thereof.

5. A signalling device comprising a vane, means for supporting said vane for movement about an axis between angularly displaced positions, means for selectively moving said vanes between said positions comprising a pair of arched electrodes arranged adjacent the path of movement of an outer edge of said vane, and means for selectively setting up a vane-attracting electrostatic fields between individual ones of said electrodes and said vane.

6. A device according to claim 5 wherein said electrodes are juxtaposed.

7. A device according to claim 5 wherein said electrodes are arranged in tandem relation.

8. A signalling device comprising a vane, means for supporting said vane for swinging movement about an axis displaced from a center axis of said vane, means for supporting said vane in a first position, and means for moving said vane from said first position to a second position angularly displaced therefrom including an arched electrode arranged adjacent the path of movement of an outer end edge of said vane and means for setting up a vane-attracting electrostatic field between said electrode and said vane, said arched electrode being arranged to establish a field of increasing strength in the direction of movement of the edge of said vane from its position of rest toward its angularly displaced position.

9. A signalling device comprising a vane, means for mounting said vane for swinging movement about an axis between angularly displaced positions, and means selectively operable to hold said vane in an intermediate position and to move said vane in opposite directions into angularly displaced positions including a first electrode arranged adjacent an outer edge of said vane in its intermediate position and arched electrodes located adjacent the path of movement of an outer edge of said vane at opposite sides of said first electrode, and means selectively operable to set up vane-attracting electrostatic fields between said vane and an individual ones of said electrodes.

10. A signalling device comprising a vane, means for mounting said vane for swinging movement about an axis between angularly displaced positions, and means selectively operable to hold said vane in an intermediate position to move said vane in opposite directions into angularly displaced positions including a bar-shaped electrode arranged adjacent an outer edge of said vane in its intermediate position and arched electrodes located adjacent the path of movement of an outer edge of said vane at opposite sides of said bar-shaped electrode, and means selectively operable to set up vane-attracting electrostatic fields between said vane and individual ones of said electrodes, said arched electrodes being arranged to establish an electrostatic field on increasing strength between themselves and said vane in the direction of the intended movements of said vane.

References Cited
UNITED STATES PATENTS

| 3,089,120 | 5/1963 | Aiken | 340—373 X |
| 3,210,757 | 10/1965 | Jacob | 340—373 |
| 3,304,549 | 2/1967 | Aiken | 340—373 |
| 3,319,246 | 5/1967 | Aiken | 340—373 |

JOHN W. CALDWELL, *Primary Examiner.*

THOMAS B. HABECKER, *Examiner.*

H. I. PITTS, *Assistant Examiner.*